June 10, 1952 L. R. KAHN ET AL 2,600,248

TRANSMITTER KEYER

Filed April 28, 1949

INVENTORS
LEONARD R. KAHN AND
WALTER LYONS
BY Barry Tunick
ATTORNEY

Patented June 10, 1952

2,600,248

UNITED STATES PATENT OFFICE 2,600,248

TRANSMITTER KEYER

Leonard R. Kahn, New York, and Walter Lyons, Flushing, N. Y., assignors to Radio Corporation of America, a corporation of Delaware Application April 28, 1949, Serial No. 90,242

3 Claims. (Cl. 250—8)

This invention relates to transmitters, and more particularly to frequency shift keyers for use in frequency shift telegraphy transmitters.

An object of this invention is to devise a frequency shift keying unit which is relatively inexpensive.

Another object is to devise a frequency shift keying system in which all of the elements determining the amount of frequency shift and the frequency values themselves are either crystal controlled or are of inherently high stability, whereby a very high degree of frequency stability is obtained in the system.

Still another object is to provide a frequency shift exciter unit in which small amplitude modulations superimposed on the line, such as line noise, will not cause frequency shifts or signal modulation in the transmitter.

An additional object is to provide a frequency shift keying system in which frequency transients or key clicks are greatly reduced.

A further object is to devise a frequency shift keying system the cost of which is reduced in that a common frequency shift oscillator can be used to control several transmitters at a transmitting station.

A still further object is to provide a circuit which can be used for radiophoto or facsimile transmission without the use of a special tone signal converter, the normal frequency-varying signals of radiophoto service being used to directly frequency-shift the carrier.

The foregoing and other objects of the invention will be best understood from the following description of an exemplification thereof, reference being had to the accompanying drawing, wherein.

Figures 1, 2:
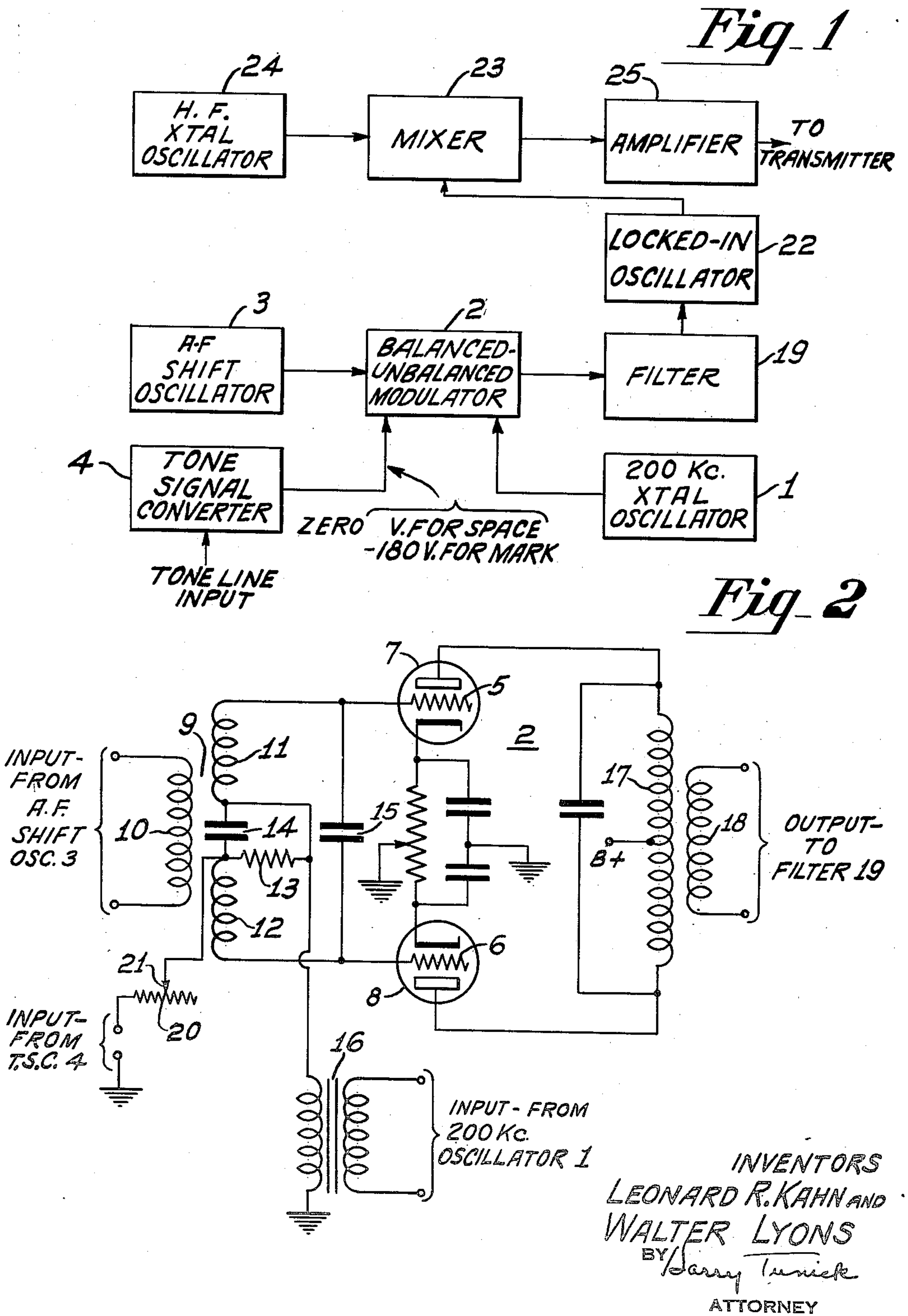
Fig. 1 is a block diagram of a system according to this invention.
Fig. 2 is a somewhat detailed circuit diagram of one of the elements of Fig. 1.

The objects of this invention are accomplished, briefly, in the following manner:

A crystal oscillator supplies carrier energy to a normally balanced modulator, while an audio frequency shift oscillator supplies a modulating voltage thereto. A keyed voltage from a tone signal converter, representing mark and space signals, is applied to the modulator in such a manner as to permit it to remain balanced during one signaling condition, say space, and to unbalance the modulator during the other signaling condition, say mark. The output of the modulator is coupled to a filter which removes one sideband therefrom, and the output of the filter is coupled to a locked-in oscillator to entrain or control the frequency of the same. During space, the modulator is balanced so that the carrier is suppressed in the output thereof; the locked-in oscillator therefore oscillates at the sum of the carrier and modulating frequencies. During mark, the modulator is unbalanced so that the carrier frequency predominates in the output thereof; the locked-in oscillator now shifts to and oscillates at the carrier frequency. Thus, a frequency shifted keyed voltage is obtained at the output of the locked-in oscillator, and this oscillator output is fed to a mixer or modulator which mixes it with the output of a high frequency crystal oscillator for transmission. Thus, the frequency of the audio frequency shift oscillator determines the amount of frequency shift which is produced in the output of the locked-in or entrained oscillator.

Now referring to the drawing, and particularly to Fig. 1 thereof, the output of a 200-kilocycle crystal-controlled oscillator 1 is fed to a modulator 2, more particularly shown in Fig. 2, which may be balanced or unbalanced, depending upon keying, and which is therefore termed a "balanced-unbalanced" modulator. The output of an audio frequency shift oscillator 3, which may have a frequency of any predetermined value within the audio range, such as 850 cycles for example, is also fed to modulator 2. The output of oscillator 1 supplies carrier energy to modulator 2, while the output of oscillator 3 supplies modulating voltage to modulator 2.

A tone signal converter 4 is connected to modulator 2 in such a way that the output thereof may be utilized to control such modulator. Converter 4 is supplied with keyed signal input from a tone line, and produces at its output a keyed direct voltage which varies from zero volts for one signaling condition, say space, to −180 volts for the other signaling condition, say mark.

Now referring to Fig. 2, which illustrates the modulator 2, the audio frequency or 850-cycle modulating input from oscillator 3 is supplied antiphasally to the control grids 5 and 6 of two triodes 7 and 8, by means of a transformer 9 having a primary 10 and two secondaries 11 and 12; the oscillator 3 output is connected to opposite ends of winding 10 while adjacent ends of the two primary windings are connected together through a resistor 13 and capacitor 14 in parallel, the free ends of the two windings 11 and 12 being connected to respective control grids 5 and 6. A suitable capacitor 15 is connected between grids 5 and 6.

The 200 kilocycle carrier input from oscillator 1 is supplied cophasally to control grids 5 and 6 by means of a transformer 16 the primary winding of which is connected across the output of oscillator 1 and the secondary winding of which is connected between ground and the adjacent ends of the two windings 11 and 12, the connection to winding 12 being made through resistor 13, shunted by condenser 14. The cathodes of the tubes 7 and 8 are each connected to ground through a conventional parallelly-connected resistance-capacitance biasing network. The anodes of tubes 7 and 8 are connected to opposite ends of a tuned output primary winding 17 in the usual manner, direct plate potential being supplied to the midpoint of this winding from a suitable source. Secondary winding 18 is coupled to winding 17 to couple the output of modulator 2 to a filter 19 to be later described.

In order to key the modulator 2 from the balanced to the unbalanced condition and vice versa, the input from tone signal converter 4 is applied through a potentiometer 20 having a movable tap 21 thereon, to that end of winding 12 which is remote from grid 6. A suitable portion of the output voltage from converter 4, which as previously stated varies from zero volts to −180 volts for the two signaling conditions, is applied between tap 21 and ground. Tap 21 is connected substantially directly to grid 6, while the cathode of tube 8 is grounded, so that the keying voltage from converter 4 is connected between the control grid and cathode of tube 8. Resistor 13 has a high enough value of resistance to prevent the keying voltage of unit 4 from affecting tube 7 to any appreciable extent.

In the spacing condition, converter 4 provides an effective potential of zero volts on modulator 2. Under these conditions, there is normal bias on tubes 7 and 8 of the modulator. Modulator 2 therefore acts as a conventional balanced modulator, substantially suppressing the 200-kilocycle carrier and delivering in winding 18 output frequencies of 200 kilocycles plus the shift frequency determined by the modulating signal from audio frequency shift oscillator 3 and 200 kilocycles minus this same shift frequency, or in other words the upper and lower sidebands of 200.85 kilocycles and 199.15 kilocycles respectively (when oscillator 3 has a frequency of 850 cycles).

The band rejection filter 19, to which the output of modulator 2 is coupled, is designed to pass the carrier frequency of 200 kilocycles and one sideband frequency, for example the upper sideband frequency of 200.85 kilocycles, and to remove or filter out the lower sideband frequency of 199.15 kilocycles.

The output of filter 19 is coupled to a driven or locked-in oscillator 22 which is preferably of the type described in Beers Patent 2,356,201, dated August 22, 1944. Such a slave oscillator, as is known to those skilled in the art, will be entrained to oscillate at the frequency of that one of the controlling voltages fed thereto which has the greatest amplitude, provided that such frequency is within the lock-in range of the oscillator. The oscillator 22, in the specific example given, has a center or rest frequency of 200.425 kilocycles, and the output voltage of filter 19 is fed as a controlling voltage to such oscillator.

In the spacing signaling condition, then, during which modulator 2 is operating as a balanced modulator and the output of filter 19 consists substantially entirely of the upper sideband frequency (the carrier frequency of 200 kilocycles being substantially balanced out in the modulator 2), oscillator 22 operates or oscillates at the upper sideband frequency, which is 200.85 kilocycles in the example given. Oscillator 22 functions as an additional filter, since it can oscillate at but one discrete frequency at a time.

The output of oscillator 22 is fed in a conventional manner to a mixer 23 which serves to mix such oscillator output with that of a high frequency or signal determining crystal oscillator 24. The output of mixer 23 is fed to an amplifier and/or doubler 25, from whence the signal is fed to an appropriate transmitter, not shown.

The tone signal converter 4 is utilized to key the balanced modulator 2 into an unbalanced state for marking. When marking, a negative potential of approximately 180 volts appears at the output of unit 4, and a portion of this potential is applied by tap 21 between the control grid 6 and the cathode of modulator tube 8 to effectively cut off conduction in said tube, thus rendering this otherwise balanced modulator unbalanced. If desired, the negative potential for this purpose may be obtained from a suitable D. C. keying source other than the tone signal converter shown.

When unbalanced, the modulator 2 has an output comprising the 200-kilocycle carrier and the sidebands, since in this case the carrier frequency is no longer balanced out in winding 18; moreover, the unbalance may be and is readily carried to such a degree that the carrier substantially exceeds in amplitude the sidebands. Therefore, under these circumstances the output from the modulator will consist of a strong 200-kilocycle signal plus two primary sideband frequencies attenuated somewhat if the percentage modulation is kept low. As before, filter 19 removes the lower sideband, passing only the 200 kilocycle carrier and the upper sideband frequency of 200.85 kilocycles. The controlling voltage fed to the driven or locked-in oscillator 22 now comprises the carrier frequency and the upper sideband frequency, with the carrier frequency having the greater amplitude. Therefore, the oscillator 22 now oscillates at the carrier frequency of 200 kilocycles.

In the marking signaling condition, then, during which modulator 22 is operating in the unbalanced state, oscillator 22 operates or oscillates at the carrier frequency, which is 200 kilocycles in the example given, while in the spacing condition oscillator 22 operates at the upper sideband frequency of 200.85 kilocycles.

In addition to its function as an additional filter, oscillator 22 has another important function. Since the change in frequency of oscillator 22 in response to the keying is a smooth transition which passes through the frequencies between those determining the mark and space conditions, any tendency toward the production of frequency transients or key clicks is markedly reduced.

An advantage of the present system as compared to the reactance tube type of frequency shift keying unit is that a much more economical design is obtained for the same degree of frequency stability. In this connection, in regard to frequency stability, it should be noted that the oscillators 1 and 24 are both crystal-controlled, while oscillator 3 is an audio frequency oscillator which can be easily designed to be quite stable in frequency. Therefore, the system as a whole has a very high degree of frequency stability. The frequency of the output of slave oscillator 22 is controlled by the frequency of the controlling voltage fed thereto, which controlling voltage has very stable values of frequency.

In the system of this invention, very little possibility exists for line noise to cause signal modulation, since in the present arrangement no other frequencies are utilized except those determined by the two crystal oscillators 1 and 24 and the audio frequency shift oscillator 3. Also, small amplitude modulations superimposed on the tone signal converter will not affect the frequency of the output from oscillator 22, because of their small amplitudes as compared to the amplitudes of the oscillator controlling voltages derived from oscillators 1 and 3; it will be recalled that said oscillator 22 oscillates or operates at the frequency of that one of the controlling voltages fed thereto which has the greatest amplitude.

Since oscillator 22 operates at 200 kilocycles or carrier frequency during mark and at 200.85 kilocycles, or the sum of carrier and audio frequency shift oscillator frequencies, during space, the frequency of the shift oscillator 3 determines the amount of frequency shift which is produced in the output of oscillator 22. Therefore, a common frequency shift oscillator 3 can be connected to feed a plurality of modulators such as modulator 2, to control the amount of frequency shift of a corresponding plurality of transmitters at a transmitting station.

This invention may be used for radiophoto transmitter service or for facsimile, without the use of a special tone signal converter which converts the frequency-varying signals to amplitude-varying signals, by the simple expedient of replacing the audio frequency shift oscillator 3 by the input line which carries the frequency-varying radiophoto or facsimile signals, using the normal frequency variations of such signals to directly frequency-shift the carrier through the medium of oscillator 22. In this modification, the tone signal converter 4 would be omitted, so that all D. C. potential is removed from the normal keying circuit of the balanced-unbalanced modulator 2; the modulator is now used in balanced condition only. According to this invention, therefore, the frequency-varying radiophoto or facsimile signals do not need to be converted into amplitude-varying signals and then back into frequency-varying signals for transmission; the frequency-varying input signals may be used to directly frequency-shift the carrier according to this invention, without the necessity of any such conversion.

Although the figure of 850 cycles was mentioned above as the amount of frequency shift of oscillator 22, it is to be understood that this was done only by way of example; the frequency of oscillator 3 determines the amount of such frequency shift and such frequency may have any desired audio value, such as anywhere within the range of 170–850 cycles, for example. Oscillator 3 may have an adjustable frequency, if desired.

What we claim to be our invention is as follows:

1. A frequency shift keyer, comprising a source of carrier energy, a fixed-frequency source of modulating energy, means for mixing energy from said two sources, said means being responsive to the application of a two-valued keying potential thereto to supply in the output thereof an oscillatory voltage which is predominantly of either carrier frequency or of sideband frequency, depending upon the value of the keying potential, a slave oscillator coupled to the output of said means to be entrained by said oscillatory voltage, and means for applying a two-valued keying potential to said means to control the same.

2. A frequency shift keyer, comprising a carrier-suppression type balanced modulator adapted to be unbalanced by the application of a keying voltage thereto, means for supplying carrier energy to said modulator, means for supplying a modulating voltage of fixed frequency to said modulator, said modulator when balanced producing in the output thereof an oscillatory voltage which is predominantly of sideband frequency and when unbalanced producing in the output thereof an oscillatory voltage which is predominantly of carrier frequency, a slave oscillator coupled to the output of said modulator, and signal-controlled means for supplying a keying voltage to said modulator to unbalance the same for one signaling condition.

3. A frequency shift keyer, comprising a normally balanced carrier-suppression type modulator including a pair of electron control devices each having a control electrode, means for supplying carrier energy to said modulator, means for supplying a modulating voltage of fixed frequency to said modulator, means for applying a negative potential to the control electrode of only one of said devices to substantially cut off current flow therein, thereby to unbalance said modulator, in response to signaling impulses of a predetermined character, said modulator when balanced producing in the output thereof an oscillatory voltage which is predominantly of sideband frequency and when unbalanced producing in the output thereof an oscillatory voltage which is predominantly of carrier frequency, a filter for removing one of the sidebands coupled to the output of said modulator, and a slave oscillator coupled to the output of said filter to be entrained by the oscillatory voltage passed thereby.

LEONARD R. KAHN.
WALTER LYONS.

REFERENCES CITED

The following references are of record in the file of this patent:

UNITED STATES PATENTS

| Number | Name | Date |
|---|---|---|
| 1,684,445 | Honaman | Sept. 18, 1928 |
| 2,073,409 | Shanklin | Mar. 9, 1937 |
| 2,120,882 | Ballantine | June 14, 1938 |
| 2,223,430 | Smith | Dec. 3, 1940 |
| 2,306,121 | Hagen | Dec. 22, 1942 |

FOREIGN PATENTS

| Number | Country | Date |
|---|---|---|
| 316,101 | Great Britain | Sept. 8, 1930 |
| 840,097 | France | Apr. 18, 1939 |